United States Patent [19]

Eng et al.

[11] Patent Number: 4,745,299
[45] Date of Patent: May 17, 1988

[54] OFF-LINE SWITCHER WITH BATTERY RESERVE

[75] Inventors: Wing K. Eng, Stanhope; Robert E. Schroeder, Flanders, both of N.J.

[73] Assignee: American Telephone and Telegraph Company, AT&T Bell Laboratories, Murray Hill, N.J.

[21] Appl. No.: 853,173

[22] Filed: Apr. 17, 1986

[51] Int. Cl.$^4$ .................................................. H02J 9/00
[52] U.S. Cl. ......................................... 307/66; 307/64; 307/87; 363/21; 363/97
[58] Field of Search ......................... 307/64, 66, 67, 68, 307/69, 70, 77, 80, 82, 83, 85, 86, 87, 48, 58, 45, 43; 363/21, 171, 20, 21, 89, 24, 97; 323/272, 269

[56] References Cited

U.S. PATENT DOCUMENTS

| | | | |
|---|---|---|---|
| 3,614,461 | 10/1971 | Speer | 307/87 |
| 3,771,012 | 11/1973 | Niederjohn | 307/66 X |
| 3,778,634 | 12/1973 | Hanrihan | 307/64 |
| 3,873,846 | 3/1975 | Morio et al. | 307/66 X |
| 3,986,097 | 10/1976 | Woods | 363/20 X |
| 4,038,559 | 7/1977 | Chun et al. | 307/64 |
| 4,131,829 | 12/1978 | Gocho | 307/85 X |
| 4,388,534 | 6/1983 | Love et al. | 307/66 |
| 4,395,639 | 7/1983 | Bring | 307/66 |
| 4,510,401 | 4/1985 | Legoult | 307/87 X |
| 4,556,802 | 12/1985 | Harada et al. | 307/87 X |
| 4,561,046 | 12/1985 | Kuster | 363/21 |
| 4,564,767 | 1/1986 | Charych | 307/87 X |
| 4,623,960 | 11/1986 | Eng | 363/21 |
| 4,631,471 | 12/1986 | Fouad et al. | 363/40 X |
| 4,673,825 | 6/1987 | Raddi et al. | 307/87 X |

Primary Examiner—William M. Shoop, Jr.
Assistant Examiner—Paul Ip
Attorney, Agent, or Firm—Alfred G. Steinmetz

[57] ABSTRACT

An off-line switcher includes an auxiliary winding on the secondary side of the power transformer coupled by a power switch to a secondary voltage source in order to provide uninterruptible power to the output from either a primary AC or a secondary DC source. The power switches coupling both primary and secondary source voltages to the power transformers are driven at identical duty cycles by a common regulation control. Differing transformation ratios between primary and secondary sources of power define different operational ranges and determine flow of power based on the magnitude of the primary source of power.

4 Claims, 3 Drawing Sheets

OFF-LINE SWITCHER WITH BATTERY RESERVE

FIELD OF THE INVENTION

This invention relates to switching type power supplies and in particular to an off-line switcher which accepts energy from both an AC line and a battery in order to provide reliable uninterrupted power to an output.

BACKGROUND OF THE INVENTION

The wide spread use of data processing type equipment has led to an increased concern with the reliability of the power sources energizing this equipment. To protect the data processing load from the uncertainties of a single source of power, power supplies have been developed which have two separate sources of energy (AC line and battery) and the ability to draw power from one or the other so that the data processing load is continuously powered.

These uninterruptible power supplies have generally assumed either a serial or parallel architecture. In a serial architecture format, a rectifier, battery and inverter are connected in tandem with the battery floating when the AC source input to the rectifier is satisfactory. This arrangement is generally satisfactory from a consideration of a quality of a signal output to the load, but is inefficient since the overall efficiency can be no higher than the product of the efficiencies of the tandem connected components. In addition, failure of any of the tandem connected components may cause the entire power supply to fail.

The parallel architecture format avoids many of the disadvantages of the serial architecture format, since the two sources of energy are fully redundant with respect to each other. While efficiency and reliability is improved, the control arrangement for substituting the load from one power source to the other is more complex; especially in those applications where a load transfer must be transient free and transparent to the load. The control arrangement must maintain synchronism and a definite phase relation between the two redundant power processing paths. While these parallel architecture arrangements can be made cost effective at relative high power levels, the added control circuitry and complex transformer design requirements mitigate against their widespread use at relatively low power levels.

SUMMARY OF THE INVENTION

Therefore, a power supply embodying the principles of the invention provides a parallel architecture arrangement to supply uninterrupted power to a load without requiring added control circuitry or an unduly complicated power transformer construction. In one particular embodiment, a single ended off-line switcher having a primary voltage source coupled by a first power switch to a power transformer, further includes a secondary voltage source such as a battery or other DC voltage source which is coupled by a second power switch to an auxiliary winding on the secondary side of the power transformer. Both the first and second power switches are driven by a common voltage regulation control. The respective winding turns of the primary winding, the secondary and the auxiliary winding are selected so that output voltage regulation for the primary and secondary voltage sources is effective over substantially different input voltage ranges that include a small common overlap range. Normally the regulated output voltage is derived solely from the primary AC power line voltage source. If this line voltage source is degraded in magnitude, regulation control slips into the overlap range in which both primary and secondary voltage sources contribute to the output power. Should primary power fail entirely, the output power is supplied solely from the secondary voltage source.

BRIEF DESCRIPTION OF THE DRAWING

An understanding of the invention may be readily attained by reference to the following detailed description and the accompanying drawings in which.

DETAILED DESCRIPTION

Figure 1:
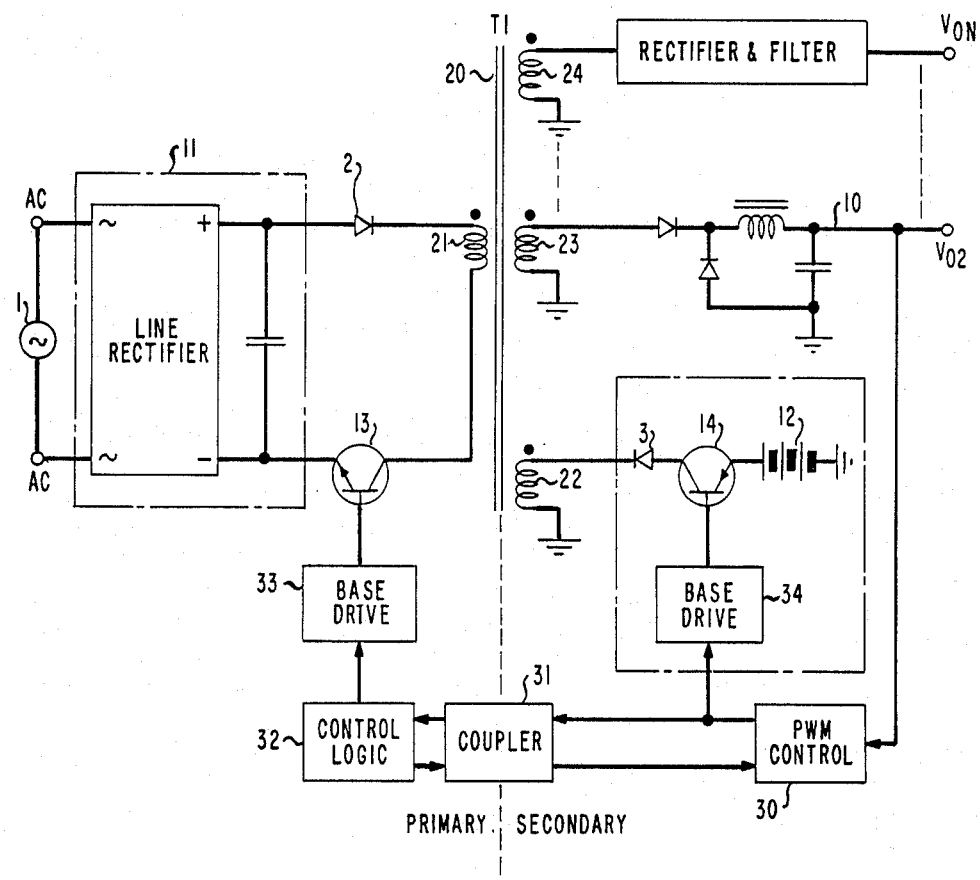
FIG. 1 is a block schematic of a power supply embodying the principles of the invention.
Figure 2:
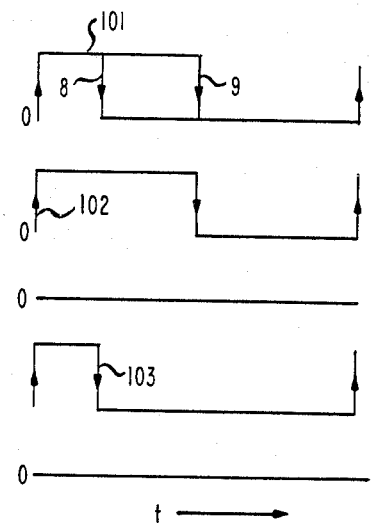
FIG. 2 discloses idealized switching waveforms of the power supply of FIG. 1.

An off-line switcher designed to be energized by AC line voltage and embodying the principles of the invention is shown in FIG. 1. It includes provisions for deriving power supplied to a load at output terminal 10 from one or both of two independent sources of DC voltage. Source 1 representing a commercial AC line voltage source is coupled to a rectifier filter circuit 11. Circuit 11 is coupled to a diode 2 which is operative to prevent reverse power flow from winding 21 when the input voltage is low. The secondary or reserve voltage source 12 is illustratively shown as a battery and is coupled to winding 22 through diode 3, which prevents reverse power flow into battery 12. Power flow from either the AC source 1, or source 12, is through power transformer 20 to one or more outputs, such as terminal 10. Power flow from the primary AC input voltage source 1 is coupled to a primary winding 21 by power switch 13 whereas power flow from the secondary source 12 is coupled to an auxiliary winding 22 by power switch 14. Voltage regulation at output 10 is controlled by a pulse width modulation control 30. The output voltage is sensed at output terminal 10 and a pulse control signal shown by waveform 101 in FIG. 2 is coupled, via a primary to secondary isolation coupler 31, to logic circuit 32. Coupler 31 may comprise an optical coupler, a pulse transformer, or any other transmission medium capable of maintaining ground isolation. This pulse control signal is utilized by logic circuit 32 to supply timing signals to base drive 33 to control a duty cycle of a power switch 13 as shown by waveform 103 in FIG. 2. Power switch 13 may comprise a bipolar power transistor or a FET power transistor, but is not necessarily limited to these devices. Voltage pulse waveform 103 used to control the drive of power switch 13 has a variable pulse width. This pulse width is controlled by PWM control 30 in order to regulate the voltage output at output terminal 10.

The output of PWM control 30 is also applied to base drive 34 to control a duty cycle of power switch 14 either bipolar or FET which couples the reserve voltage source 12 to the auxiliary winding 22. The duty cycle of power switch 14 is shown by waveform 102 in FIG. 2. It is normally longer in duration than the pulse width at waveform 103 since it supplies the same regulated output voltage from a DC battery voltage slightly lower than the DC voltage output of rectifier filter 11.

The different duty cycles of waveforms 102 and 103 are disclosed to illustratively show the typical duty cycles at which the AC voltage source 1 and DC voltage source 12 normally supply power to the output. Both power switches 13 and 14 are simultaneously driven at a common duty cycle and for a certain range as shown by waveform 101 between edges 8 and 9 both switches couple power to the output. To the left of trailing edge 8 only the switch 13 couples power to the output and to the right of trailing edge 9 only the power switch 14 couples power to the output.

Figure 3:
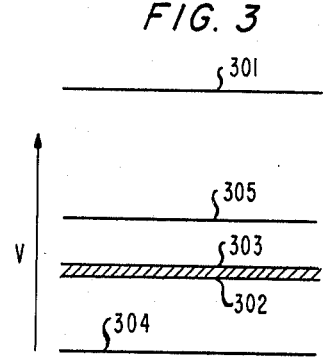
FIG. 3 discloses a graph of operative voltage ranges of the power supply of FIG. 1.

While the two power switches 13 and 14 are operated with the same duty cycles, the resultant output at output 10, as derived from the AC primary input 11 and the secondary source 12, is derived from different input voltage ranges such as shown in FIG. 3 wherein lines 301 and 302 represent voltage level boundaries of the rectified DC operative input voltage range supplied by AC primary voltage source 1 and lines 303 and 304 represent boundaries of an operative input voltage range supplied by the secondary source 12. As shown, the voltage ranges are different except for a small overlap between lines 302 and 303. Line 305 represents an alarm level at which an alarm indicating low AC line voltage is signaled if the voltage drops below this level. Since power switches 13 and 14 operate at identical duty cycles, the differing voltage ranges are achieved by control of source voltage levels and by differing transformation ratios between primary winding 21 to secondary winding 23 and between auxiliary winding 22 to secondary winding 23. Hence, under normal operating conditions where output is supplied from the AC line voltage, the output voltage is defined by the equation:

$$V_O = V_P \frac{N_{23}}{N_{21}} D$$

where:
$V_O$ is the output voltage,
$V_P$ is the rectified AC line voltage,
$N_{23}/N_{21}$ is the secondary to primary turns ratio, and
$D$ is the duty cycle at which the power switches 13 and 14 are operated. In the illustrative embodiment of a forward converter, this value is normally less that ½. However, the invention may be embodied in other types of converters such as flyback converters for example.

Under emergency conditions where the AC line has degraded or failed, the output voltage is defined by the equation:

$$V_O = V_B \frac{N_{23}}{N_{22}} D$$

where:
$V_O$ and $D$ are as defined above;
$V_B$ is the reserve voltage; and
$N_{23}/N_{22}$ is the secondary to auxiliary ratio.

It is apparent, from the foregoing that at a given duty cycle, the output voltage is dependent upon a turns ratio in its transformer coupled power flow path from source to the output if both primary and secondary voltage sources are identical. The turns ratio $N_{23}/N_{21}$ in primary power path is selected so that the control 30 regulates over a generally higher input voltage range than that for the reserve power path. A drop in AC line voltage first causes control 30 to increase the duty cycle of both power switches to maintain the regulated output voltage. If it continues dropping the output voltage is partially maintained by power from the reserve voltage source in the overlap region between lines 302 and 303 in FIG. 3, and when the AC line voltage drops below a threshold level, as shown by line 302, corresponding to a critical duty ratio D, the output voltage is sustained entirely by the reserve voltage source in the regions defined by voltage levels 304 to 303. It is readily apparent that by control of relative transformation ratios of the nominal AC line voltage and the selected battery voltage, an uninterruptible power supply can be implemented which utilizes a common regulation control system for controlling both primary and reserve power.

Figure 4:
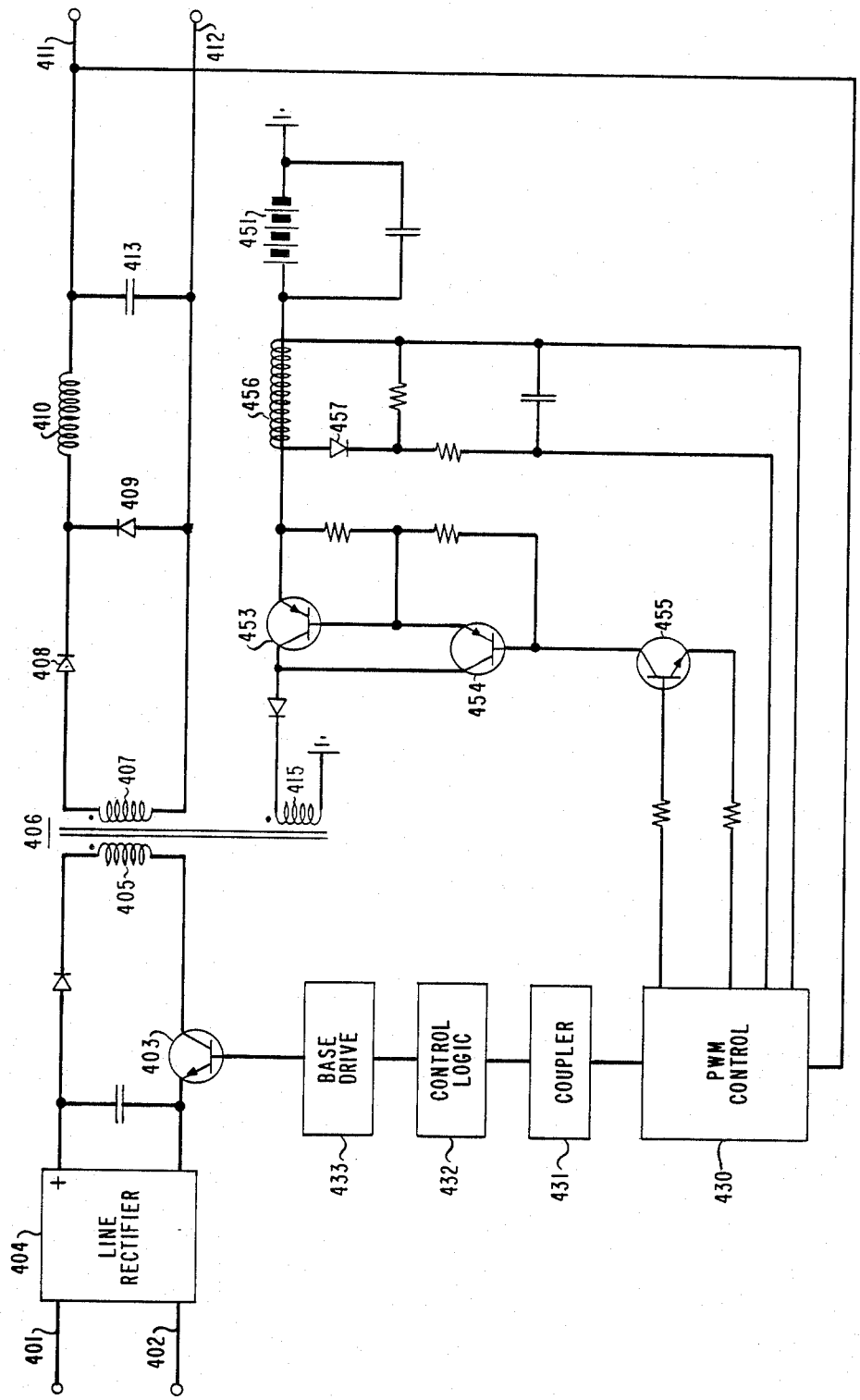
FIG. 4 is a schematic of a power train of the power supply of FIG. 1.

An off-line switcher operating as a forward type converter and providing reserve battery power in accordance with the principles of the invention is schematically disclosed in FIG. 4. Primary power, supplied from an AC line source, is coupled to input terminals 401 and 402 and is rectified and filtered by rectifier/filter circuitry 404. A connection to the primary winding 405 of transformer 406 is periodically completed by the power switching transistor 403. The rectified DC output at leads 411 and 412 is derived from secondary winding 407 and rectified by diode 408. Diode 409 provides a flyback path for the output filter inductor 410. The output voltage is sensed across the filter capacitor 413 by a pulse width modulation controller 430, from which control signals are transmitted via coupler 431 to a logic circuit 432 which, in turn, controls timing of a drive circuit 433 to control a duty cycle of power switching transistor 403 in order to regulate the output voltage across the filter capacitor 413.

A battery 451 is utilized as a reserve energy source and is coupled to an auxiliary winding 415 of power transformer 406 by the Darlington connected power transistor switch 453 (or power FET) whose switching is under control of base drive transistor 455 which is in turn responsive to an output of the PWM control 430. The duty cycle of power switch 453 is accordingly in synchronism with and substantially identical to the duty cycle of power switch 403.

While power switches 403 and 453 are switched in unison, power is supplied to the output within one of the differing regulation ranges which are established by the relative turns ratio of windings 405 and 415 with respect to the secondary winding 407.

The reserve energy supplied by battery 451 is current limited. A current transformer 456 is utilized to sense the peak discharge current flowing from the battery 451 to the transistor switch 453. This current signal is rectified by diode 457 and filter 458 to derive a DC control signal. This control signal is coupled to the PWM controller 430 via leads 461 and 462 and is utilized through the controller 430 to provide overload protection.

What is claimed is:

1. A switching type power supply comprising:
   a power transformer including a primary winding a secondary winding and an auxiliary winding, and having a first transformation ratio between the primary winding and secondary winding and a second transformation ratio between the auxiliary winding and the secondary winding,
   a first input means for accepting a primary source of energy, a second input means for accepting a secondary source of energy, an output means for coupling energy from the secondary winding to a load, the first input means being continuously coupled to supply energy to the primary winding through a first power switch continuously periodically connecting the first input means to the primary winding, the second input means being continuously coupled to supply energy to the auxiliary winding through a second power switch continuously periodically connecting the second input means to the auxiliary winding, a regulation control responsive to a magnitude of a signal generated at the output means by the power supply and operative in responsive to the magnitude of a signal for continuously and concurrently driving the first and second power switch at a common duty cycle, and the first and second transformation ratios selected such that the first and second power switches transmit power signals to the output means within first and second input voltage ranges, respectively; whereby:

the first input voltage range is operative to derive output energy from the primary source of energy when it is fully operative and the second input voltage range is operative to derive output energy from the secondary source of energy when the primary source of energy is below its desired operating limits.

2. A switching type power supply comprising:

a first input means for accepting a primary source of energy, a second input means for accepting a secondary source of energy, an output means for coupling energy to a load, a first power switch driven at a periodic pulse rate for controlling flow of energy from the first input means to the output means, a second power switch driven at a periodic pulse rate for controlling flow of energy from the second input means to the output means, a power transformer including a primary winding continuously periodically connected via the first power switch to the first input means, an auxiliary winding continuously peridically connected via the second power switch to the second input means, and a secondary winding coupled to the output means, and the primary and secondary winding having a first turns ratio and the auxiliary and secondary winding having a second turns ratio, regulation control means for continuously and concurrently driving the first and second power switch at an identical periodic pulse rate such that the first power switch enables flow of energy to the output means within a first input voltage range at the first input means and the second power switch enables flow of energy to the output means within a second input voltage range at the second input means whereby the first and second voltage range are substantially different with a small overlap in a finite value range, the regulation control means simultaneously and continuously driving the first and second power switch at an identical duty cycle and the first and second voltage range being controlled by differing values of the first and second turns ratio.

3. A switch type regulator as defined in claim 2 and further including a monitoring circuit coupled to sense a discharge current from the secondary source of energy and means to regulate a discharge current from the secondary source of energy.

4. A switching type regulator as defined in claim 3 wherein the regulation control means is directly coupled to the second power switch, and is coupled to the first power switch through a signal coupler providing DC isolation.

* * * * *